United States Patent Office 3,595,913
Patented July 27, 1971

3,595,913
CRYSTALLIZATION OF ACETYLSULFANILYL CHLORIDE
Lawrence James Ross, North Plainfield, and Albert Joseph Costello, Oakland, N.J., assignors to American Cyanamid Company, Stamford, Conn.
No Drawing. Filed May 12, 1969, Ser. No. 823,947
Int. Cl. C07c *143/70*
U.S. Cl. 260—543R 7 Claims

ABSTRACT OF THE DISCLOSURE

Pure N-acylsulfanilyl chlorides are obtained from the reaction of an acylanilide and chlorosulfonic acid by adding an organic solvent and a cationic or nonionic surfactant to the reaction mixture after reaction is complete but prior to crystallizing the product. The product is precipitated by adding water to the reaction mixture to reduce the sulfuric acid strength thereof to below about 50%.

---

This invention relates to an improved method for the isolation of N-acylsulfanilyl chlorides. More particularly, this invention relates to a method for isolating N-acylsulfanilyl chlorides by crystallization from acid solutions thereof.

Acylsulfanilyl chlorides, particularly acetylsulfanilyl chloride (ASC), are important intermediate compounds used in the preparation of sulfonamide drugs and for many pharmaceutical processes. It is essential that these products have a high degree of purity and that they be kept dry since they react with water, particularly at elevated temperatures.

At the present time, acylsulfanilyl chlorides are produced in the form of a slurry in dilute acid media by reacting an acylanilide and chlorosulfonic acid and then drowning the mixture in ice water. The solid is obtained by filtering, washing with water and drying. The wet cake obtained contains about 40 to 50% water and appreciable amounts of by-product acylsulfanilic acid as a contaminant are retained in the particles of the product upon drying. The removal of the acylsulfanilic acid from the product is difficult and necessitates the use of expensive purification processes now employed commercially. While such processes are capable of producing a dry product of high purity, they are undesirable in that they require elaborate equipment, large usages of solvent, and may result in a considerable lowering of product yield.

Exemplary of the prior art is the process described in U.S. Pat. No. 2,383,128 wherein a water-immiscible, inert solvent is first added to an aqueous slurry of ASC to wet the ASC particle surfaces with the solvent rather than with the water. The water is removed and the remaining slurry is filtered. The wet cake is heated at moderate temperature to drive off the remaining water and solvent and to obtain a dry product. This process is undesirable in that it requires excessive quantities of solvent and does not achieve the required product purity, thus necessitating subsequent recrystallizations from an organic solvent.

U.S. Pat. No. 2,996,541 discloses an alternative process for making ASC. To an ASC mixture, prepared by reacting anhydrous chlorosulfonic acid and acetanilide, is added enough water to react with all of the free chlorosulfonic acid to decompose it and evolve HCl. After HCl liberation has ceased, additional water is added in an amount only sufficient to precipitate substantially all the ASC and maintain the reaction by-products, including sulfuric acid, in solution. An organic solvent for ASC, which is immiscible and unreactive with sulfuric acid in the system after the water addition step, is then added to the solution to facilitate product crystal growth, the solvent being utilized in an amount of 10–15% based on the weight of the dry ASC obtained. The resultant mixture is aged for a minimum of about 30 minutes to further facilitate product crystal growth while the temperature is maintained in the range of 20–60° C. This process is said to minimize solvent addition. However, this process results in lower product yields, while substantial amounts of the acetylsulfanilic acid contaminant remain in the product. This process also necessitates a complicated procedure for water addition requiring accurate time controls over HCl liberation and product crystallization and is therefore difficult to perform.

It is an object of the present invention to provide a process for making high purity N-acylsulfanilyl chlorides. It is a further object of this invention to provide a process for making N-acylsulfanilyl chlorides which minimizes the use of organic solvents and which does not require aging during crystal growth. Further objects of this invention will be evident in view of the following detailed disclosure.

In accordance with the present invention, an organic water-immiscible solvent for the product and either a cationic or non-ionic surfactant or mixtures of the surfactants are added to the reaction product from the reaction of chlorosulfonic acid and an acylanilide before the N-acylsulfanilyl chloride has crystallized. The solvent and surfactant are added to the reaction mixture after reaction is complete and either prior to or after it has been treated with water in amounts less than that which will effect crystallization of the N-acylsulfanilyl chloride. The surfactant may be added in solution in the water used to dilute the mixture or it may be dissolved in the solvent and added with it or it may be added alone. Thereafter, the reaction product is further diluted with water to crystallize and precipitate the product N-acylsulfanilyl chloride. The precipitate is then collected, washed and dried.

It has now been discovered that the addition to the reaction mixture of a suitable quantity of the inert water-immiscible solvent and the addition of a cationic or non-ionic surfactant prior to crystallizing the product, followed by dilution of said mixture with water to effect precipitation, produces acylsulfanilyl chloride in good yields and of higher purity with respect to acylsulfanilic acid contaminant without resort to recrystallization purification procedures than heretofore possible. This result is surprising in view of the fact that the solvent is added in amounts far less than would be required to completely dissolve the product. It is also surprising in view of the fact that purity resulting from the use of combination of solvent and surfactant is higher than that obtained by their separate use even though no change in crystal habit is effected. The process of the present invention produces an acylsulfanilyl chloride, particularly ASC, of greater purity than previously obtained without subsequent recrystallizations and overcomes many of the deficiencies of previous processes.

The purification process of the invention is applicable to reaction products obtained by conventional chlorosulfonation procedures whereby an acylanilide is brought into reactive contact with about 3 to 7, preferably about 5 moles, of chlorosulfonic acid under anhydrous conditions. Normally, chlorosulfonation is effected at temperatures of about 40° C. to 80° C. in about 0.5 to 2.0 hours. After chlorosulfonation is complete, the reaction mixture is cooled to about 10–40° C., preferably to about 20° C. In accordance with the present invention, at any time prior to crystallizing the product, there is added to the reaction mixture about 2.5–25%, preferably 5–15%, based on the theoretical amount of the acylsulfanilyl chloride present, of a water-immiscible solvent which is not reactive with sulfuric acid. Furthermore, in accordance with this invention, a surfactant is added to the reaction mixture at any time prior to crystallizing the product. The surfactant is added in amounts of from 0.1% to 5.0%, preferably from 1.0% to 2.0% based upon the theoretical amount of the acylsulfanilyl chloride.

In general, any organic solvent which is water-immiscible, inert to sulfuric acid and dissolves the acylsulfanilyl chloride may be used. Among the solvents which may be employed are aliphatic hydrocarbons such as cyclohexane and petroleum ether; halohydrocarbons such as ethylene dichloride, trichloroethane, dichloromethane, chlorobenzene and chloroform; and aromatic hydrocarbons such as benzene, toluene, xylene, etc. Among the surfactants which may be employed are those classified as cationic or non-ionic such as ethoxylated stearylamine, N,N - dioctadecyl - N,N-dimethyl ammonium chloride, ethoxylated nonylphenol and the like.

The product is precipitated by adding water to the reaction mixture after reaction is complete to convert all the excess chlorosulfonic acid to sulfuric acid and to reduce the sulfuric acid strength of the reaction mixture to the point wherein precipitation is effected. In the following description, reference will be made to sulfuric acid strength of the reaction mixture in terms of percentage. A solution which is referred to as 100% acid strength is that resulting from the reaction of all the chlorosulfonic acid to produce sulfuric acid or the product as shown in Equations I and II below and prior to diluting the thus obtained reaction mixture with water. The acid strength of the reaction mixture is reduced by adding water.

Equation I:

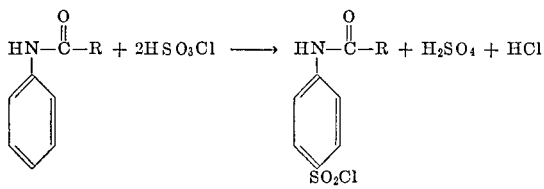

Equation II: $HSO_3Cl + H_2O \longrightarrow H_2SO_4 + HCl$

In Equation I, R is alkyl from 1 to 6 carbon atoms. Crystallization is initiated when the sulfuric acid strength of the reaction mixture is reduced to about 70%. During conversion of the chlorosulfonic acid to sulfuric acid, undesirable excessive foaming due to evolution of HCl can occur if care is not taken during the water addition. It has been found the conversion can be effected without excessive foaming when the reaction mixture contains one of the solvents of the present invention. Accordingly, in one aspect of the present invention, it is preferred that the organic solvent be added to the reaction mixture prior to adding water thereto. It is also preferred to add the surfactant with water to the reaction mixture rather than adding it separately, in order to facilitate its dispersion in the reaction mixture.

The desired product is then collected by further dilution. Thus, an additional quantity of water is added to reduce the sulfuric acid concentration to below about 50%, with sufficient cooling to keep the temperature below about 45° C. It is preferred to reduce the sulfuric acid concentration to between about 30% and 45% in order to assure relative complete separation of the product while minimizing process cooling requirements. Furthermore, the mother liquor obtained in this preferred acid concentration range contains acylsulfanilic acid in concentrated amounts which facilitates recovery thereof for further use, as for example to prepare dyes.

The solid product precipitates and is filtered, washed with ice water until the wash is weakly acidic, neutralized further by washing with a dilute solution of sodium bicarbonate or similar weak base, and finally rinsed with water again. The product is then dried with a current of air at a temperature between about 50° C. and about 100° C. The product upon drying is generally found to have an acylsulfanilyl chloride content of at least 98% and an acylsulfanilic acid content of less than about 0.5%.

Suitable acylanilide reactants which can be employed are represented by the formula:

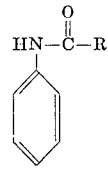

wherein R is alkyl having from 1 to 6 carbon atoms. Suitable acylanilides include acetanilide, propanilide, butyranilide and the like.

The invention is further illustrated by the following examples in which the parts are by weight.

EXAMPLE 1

To 207.4 parts (1.78 moles) of chlorosulfonic acid in a suitable reactor was added 48 parts (0.356 mole) of acetanilide at a temperature of 60° C. A mole ratio of 5:1, respectively, was employed. After such addition was complete, the reaction mixture was maintained at 60° C. for one hour then reduced to 20° C. 8.3 parts of ethylene dichloride was added, followed immediately by the addition of 19.3 parts of water. The temperature was adjusted to 30–35° C. and 105.4 parts of water containing 0.83 part of a surfactant comprising the reaction product of stearylamine with 10 moles of ethylene oxide was added while maintaining the temperature at 30–35° C. The mixture was then cooled to 20° C., agitated for 30 minutes and an additional 220.6 parts of water added at 20° C. The solid product which precipitated was filtered, washed with ice water until the wash water was neutral to Congo Red indicator and then washed with 30 parts of a 1% solution of sodium bicarbonate. A final rinse with 250 parts of ice water was run and the product dried.

There was obtained 63.0 parts of product which represented 76% yield and contained 98% of acetylsulfanilyl chloride as determined by the Volhard determination of non-ionized chloride and 0.5% of acetylsulfanilic acid as determined by non-aqueous titration with tetrabutyl ammonium hydroxide.

This example represents a preferred embodiment of the present invention.

EXAMPLE 2

The procedure of Example 1 was followed throughout except that the addition of ethylene dichloride was omitted and no surfactant was employed in the dilution water.

There was obtained 64.3 parts of product which represented 77.5% yield and contained 93.0% of acetylsulfanilyl chloride and 5.5% of acetylsulfanilic acid, determined as described previously.

Comparison of the product purity of Examples 1 and 2 shows the advantage of the use of the combination of solvent and surfactant in reducing the content of acetylsulfanilic acid.

EXAMPLE 3

The procedure of Example 1 was followed throughout except that the reaction product of stearylamine with 10 moles of ethylene oxide was omitted from the dilution water.

There was obtained 64.4 parts of product which represented 76.6% yield and contained 97.3% acetylsulfanilyl chloride and 1.1% acetylsulfanilic acid, determined as previously described.

This example shows that while the use of solvent alone reduces the content of acetylsulfanilic acid in the product, the result is not as desirable as a process employing both solvent and surfactant as in Example 1.

EXAMPLE 4

The procedure of Example 1 was followed throughout except that the addition of ethylene dichloride was omitted.

There was obtained 64.8 parts of product which represented 78% yield and contained 95.6% of acetylsulfanilyl chloride and 2.2% of acetylsulfanilic acid, determined as described previously.

This example shows that while the use of surfactant alone reduces the content of acetylsulfanilic acid in the product, the result is not as desirable as a process employing both solvent and surfactant as in Example 1.

EXAMPLE 5

The chlorosulfonation product prepared in Example 1 was drowned in ice water. The mixture was filtered, the solid washed and reslurried in water and treated with solvent in accordance with Example 1 of U.S. Pat. No. 2,383,128.

There was obtained 63.9 parts of product which represented 77% yield and contained 95.3% acetylsulfanilyl chloride and 1.21% acetylsulfanilic acid, determined as previously described.

This example shows that the purity of the product obtained by the process of U.S. Pat. No. 2,383,128, is not as high as that of the product of the present invention, based on acetylsulfanilic acid content.

EXAMPLE 6

A reaction product obtained from 79 g. of acetanilide and 340 g. of chlorosulfonic acid by the procedure of Example 1 was diluted with 106.3 ml. of water keeping the temperature below about 40° C. to convert the chlorosulfonic acid to sulfuric acid. A solution of 1.1 g. of a surfactant comprising the reaction product of stearylamine with 10 moles of ethylene oxide in 11.0 g. of ethylene dichloride was then added. Thereafter an additional 408 ml. of water was added to the reaction mixture while maintaining the temperature below about 40° C. During this latter addition, the acetylsulfanilyl chloride precicipated. The product was isolated, washed and dried to give 106.1 g. of product assaying as 98.7% acetylsulfanilyl chloride containing 0.35% acetylsulfanilic acid. This represents a 76.8% real yield of product.

This example shows that a satisfactory yield of good purity product is obtained in accordance with this invention when the surfactant and solvent are simultaneously added to the reaction product prior to precipitation.

We claim:
1. In the process of obtaining N-acylsulfanilyl chloride by reacting an acylanilide and chlorosulfonic acid under anhydrous conditions to give a crude solution of reaction product and treating the latter solution to recover N-acylsulfanilyl chloride substantially free of contamination by reaction by-products;

the improvement which comprises adding to the crude solution (a) water; (b) a water-immiscible organic solvent which is inert to sulfuric acid and which dissolves N-acylsulfanilyl chlorides and (c) a cationic or non-ionic surfactant in an amount sufficient to disperse the N-acylsulfanilyl chloride, said addition of surfactant and solvent being prior to crystallizing the N-acylsulfanilyl chloride and the water being added in sufficient amounts to decompose the excess chlorosulfonic acid to sulfuric acid and precipitate the desired pure N-acylsulfanilyl chloride from the resultant dispersion.

2. The process of claim 1 wherein the acylanilide is acetanilide and the product is N-acylsulfanilyl chloride.

3. The process of claim 1 wherein the organic liquid is a halogenated hydrocarbon.

4. The process of claim 1 wherein the surfactant is added to the crude solution as an aqueous mixture.

5. The process of claim 1 wherein the N-acylsulfanilyl chloride is precipitated from solution by adding water to reduce the sulfuric acid concentration to between about 30% and 45% while maintaining the temperature of the mixture below about 45° C.

6. The process of claim 1 wherein the organic solvent is added to the reaction mixture prior to converting chlorosulfonic acid to sulfuric acid.

7. The process of claim 1 wherein the organic solvent and surfactant are added to the reaction product as a mixture after excess chlorosulfonic acid is converted to sulfuric acid and before the N-acylsulfanilyl chloride is precipitated.

References Cited
UNITED STATES PATENTS 3,211,786  10/1965  Mueller ............ 260—543

LEWIS GOTTS, Primary Examiner

E. J. GLEIMAN, Assistant Examiner